United States Patent
Liang et al.

(10) Patent No.: US 10,415,590 B2
(45) Date of Patent: Sep. 17, 2019

(54) ELECTRIC COOLANT PUMP

(71) Applicant: Johnson Electric S.A., Murten (CH)

(72) Inventors: Guan Yin Liang, Shenzhen (CN);
Hong Liang Zhang, Hong Kong (CN);
An Bang Chen, Shenzhen (CN); Yan Ping Ren, Shenzhen (CN); Rui Feng Qin, Hong Kong (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 261 days.

(21) Appl. No.: 15/244,343

(22) Filed: Aug. 23, 2016

(65) Prior Publication Data
US 2017/0058915 A1    Mar. 2, 2017

(30) Foreign Application Priority Data
Aug. 26, 2015    (CN) .......................... 2015 1 0533044

(51) Int. Cl.
*F04D 29/42* (2006.01)
*H02K 5/20* (2006.01)
(Continued)

(52) U.S. Cl.
CPC ........... *F04D 29/426* (2013.01); *F04D 13/06* (2013.01); *F04D 13/0626* (2013.01); *F04D 13/0686* (2013.01); *F04D 29/22* (2013.01); *F04D 29/5806* (2013.01); *F04D 29/5893* (2013.01); *H02K 5/20* (2013.01); *F01P 5/12* (2013.01); *F01P 2005/125* (2013.01); *F04D 29/026* (2013.01); *F05B 2240/14* (2013.01); *F05B 2240/30* (2013.01); *F05B 2240/57* (2013.01);
(Continued)

(58) Field of Classification Search
CPC .... F04D 29/426; F04D 29/5806; F04D 29/22; F04D 29/5893; F04D 29/026; F04D 13/0626; F04D 13/0686; F04D 13/06; F01P 5/12; F01P 2005/125; F05B 2260/2241; F05B 2280/2004; F05B 2280/1021; F05B 2240/14; F05B 2240/30; F05B 2240/57; H02K 5/20
USPC ................................ 417/366, 369, 370, 372
See application file for complete search history.

(56) References Cited

U.S. PATENT DOCUMENTS 2,925,041 A * 2/1960 Sigmund ............. F04D 15/0094
                                                    310/63
3,220,350 A * 11/1965 White .................. F04D 13/0613
                                                    415/115
(Continued)

*Primary Examiner* — Nathan C Zollinger
(74) *Attorney, Agent, or Firm* — Muncy, Geissler, Olds & Lowe, P.C.

(57) ABSTRACT

An electric coolant pump includes an outer housing, a motor, an impeller, and an electrical control unit. The outer housing includes a first housing portion, a second housing portion, and a partition plate integrally formed. The partition plate is disposed between the first housing portion and the second housing portion. The motor is received in the first housing portion. The motor includes a sealing sleeve, a stator disposed on an inner wall surface of the outer housing, and a rotor rotatably received in the sealing sleeve. The impeller is driven by the rotor of the motor to drive a coolant to flow. The electrical control unit is received in the second housing portion and electrically connected to the motor. The electrical control unit and the impeller are respectively located at two opposite ends of the motor.

12 Claims, 6 Drawing Sheets

(51) Int. Cl.
*F04D 13/06* (2006.01)
*F04D 29/22* (2006.01)
*F04D 29/58* (2006.01)
*F01P 5/12* (2006.01)
*F04D 29/02* (2006.01)

(52) U.S. Cl.
CPC ............. *F05B 2260/2241* (2013.01); *F05B 2280/1021* (2013.01); *F05B 2280/2004* (2013.01)

(56) References Cited

U.S. PATENT DOCUMENTS

| | | | | |
|---|---|---|---|---|
| 5,644,178 | A * | 7/1997 | Halm | H02K 3/50 310/43 |
| 8,839,503 | B2 * | 9/2014 | Yi | H02K 1/148 29/596 |
| 10,001,139 | B2 * | 6/2018 | Zhang | F04D 29/5813 |
| 2004/0062664 | A1 * | 4/2004 | Weigold | F04D 13/0626 417/357 |
| 2005/0214135 | A1 * | 9/2005 | Shibuya | F04D 29/0465 417/357 |
| 2013/0213325 | A1 * | 8/2013 | Kim | F01P 5/12 123/41.44 |
| 2013/0259720 | A1 * | 10/2013 | Mills | F04D 29/5806 417/410.1 |
| 2014/0010684 | A1 * | 1/2014 | Joschko | H05K 7/209 417/410.1 |
| 2014/0241915 | A1 * | 8/2014 | Maruyama | F04D 25/0606 417/410.1 |

* cited by examiner

ELECTRIC COOLANT PUMP

CROSS REFERENCE TO RELATED APPLICATIONS

This non-provisional patent application claims priority under 35 U.S.C. § 119(a) from Patent Application No. 201510533044.5 filed in The People's Republic of China on 26 Aug. 2015.

FIELD OF THE INVENTION

This invention relates to a liquid pump, and in particular to an electric coolant pump for a vehicle cooling system.

BACKGROUND OF THE INVENTION

With the development of industry, pumps have been widely used in various power machinery as a power source for liquid flow in mechanical systems. For an internal combustion engine, the fuel system, lubricating system and cooling system all require a pump to drive liquid in these systems to achieve liquid circulation in the systems. With respect to the cooling system, a coolant pump drives a coolant, which makes the coolant flow over cylinders of the internal combustion engine to take away heat generated by the internal combustion engine. As such, the internal combustion engine would not be overheated.

There typically has two kinds of pumps, i.e., mechanical pumps and electric pumps. A mechanical pump is usually driven by the internal combustion engine of a vehicle, where power of an output shaft of the internal combustion engine is transmitted to the pump through belts, which is simple in construction. In this case, the rotation of the mechanical coolant pump is decided by the engine and can hardly be adjusted by a user. An electric pump is powered by electricity and controlled by an independent electrical control unit. In this case, the electric pump is not subject to the rotation speed of the engine, and the output power of the coolant pump can be adjusted according to various temperature of the internal combustion engine. The electric pump can operate flexibly and is more energy-efficient.

A conventional electric coolant pump typically includes a motor and an impeller driven by the motor. The motor includes a stator and a rotor rotatable relative to the stator. The stator is wound with windings which are connected to the electrical control unit. The rotor is provided with a magnet. The impeller is connected to the output shaft of the rotor. The electrical control unit controls the intensity and direction of the electrical current flowing through the stator windings, making the stator windings generate a variable magnetic field. The variable magnetic field interacts with the magnet of the rotor to drive the rotor and hence the impeller connected to the rotor to rotate, which in turn drives the coolant to circulate in the cooling system loop and cool the vehicle internal combustion engine to avoid be over-heated.

Because the electric cooling pump is electrically controlled, the electrical control unit itself generates a large amount of heat during operation of the pump. If the heat cannot be effectively dissipated and therefore accumulated within the coolant pump, the electrical control unit may work at a high temperature state, which may cause failure of the electrical components and affect the reliability of the coolant pump. The electric coolant pump usually includes a housing and a cover. In assembly, the housing and cover need to be sealed to avoid liquid leakage. In addition, assembly of the housing and the cover follows strict procedures, which limits the production efficiency.

SUMMARY OF THE INVENTION

Thus, there is a desire for an electric coolant pump which has improved sealing effect and assembly efficiency.

An electric coolant pump is provided which includes an outer housing, a motor, an impeller, and an electrical control. The outer housing includes a first housing portion, a second housing portion, and a partition plate integrally formed, the partition plate is disposed between the first housing portion and the second housing portion. The motor is received in the first housing portion, and includes a sealing sleeve, a stator disposed on an inner wall of the first housing portion, and a rotor rotatably received in the sealing sleeve. The impeller is driven by the rotor of the motor. The electrical control unit is received in the second housing portion and electrically connected to the motor.

Preferably, the electric coolant pump further includes a base plate disposed in the first housing portion adjacent an end of the impeller, the first housing portion, the partition plate and the base plate cooperatively define a first receiving space, and the motor is received in the first receiving space.

Preferably, the sealing sleeve is air-tightly connected to one end of the first housing portion away from the partition plate, and the sealing sleeve is air-tightly connected with the partition plate, thus dividing the first receiving space into an inner receiving space and an outer receiving space.

Preferably, the electric coolant pump further includes a first end cap, wherein the first end cap and the base plate cooperatively define a second receiving space, the impeller is received in the second receiving space, the base plate defines a plurality of through holes for allowing the coolant to flow between the second receiving space and the inner receiving space of the first receiving space.

Preferably, the base plate defines a recess for receiving the impeller, and forms a protrusion corresponding to the recess at an opposite end, the sealing sleeve defines a space corresponding to the protrusion.

Preferably, the electric pump further includes a second end cap, wherein the second end cap, the second housing portion and the partition plate cooperatively define a third receiving space, and the electrical control unit is disposed in the third receiving space.

Preferably, a first axial end of the sealing sleeve adjacent to the partition plate has an inner diameter smaller than the diameter of a second axial end of the sealing sleeve away from the partition plate.

Preferably, the partition plate includes a fixing base, to which the sealing sleeve is air-tightly connected.

Preferably, the sealing sleeve includes an annular flange which is air-tightly attached to the first housing portion.

Preferably, a plurality of ribs are formed on an inner surface of the sealing sleeve, adjacent ribs are spaced from each other with pathway defined there between.

Preferably, the plurality of ribs includes at least one group of guide-in ribs and at least one group of guide-out ribs, the guide-in ribs and the guide-out ribs extend inclined with respect to an axial direction of the sealing sleeve, the inclined direction of the guide-in ribs is different from the inclined direction of the guide-out ribs.

Preferably, the electric coolant pump further includes a base plate mounted to an axial end of the first housing portion adjacent to the impeller, wherein the base plate defines at least one through hole corresponding to each group of guide-in ribs and guide-out ribs.

Preferably, the partition plate defines a plurality of holes, and the electrical control unit is electrically connected to the motor by plurality of pins extending through the holes of the partition plate.

Preferably, the housing is made of aluminum.

DETAILED DESCRIPTION OF THE PREFERRED EMBODIMENTS

Figure 1:
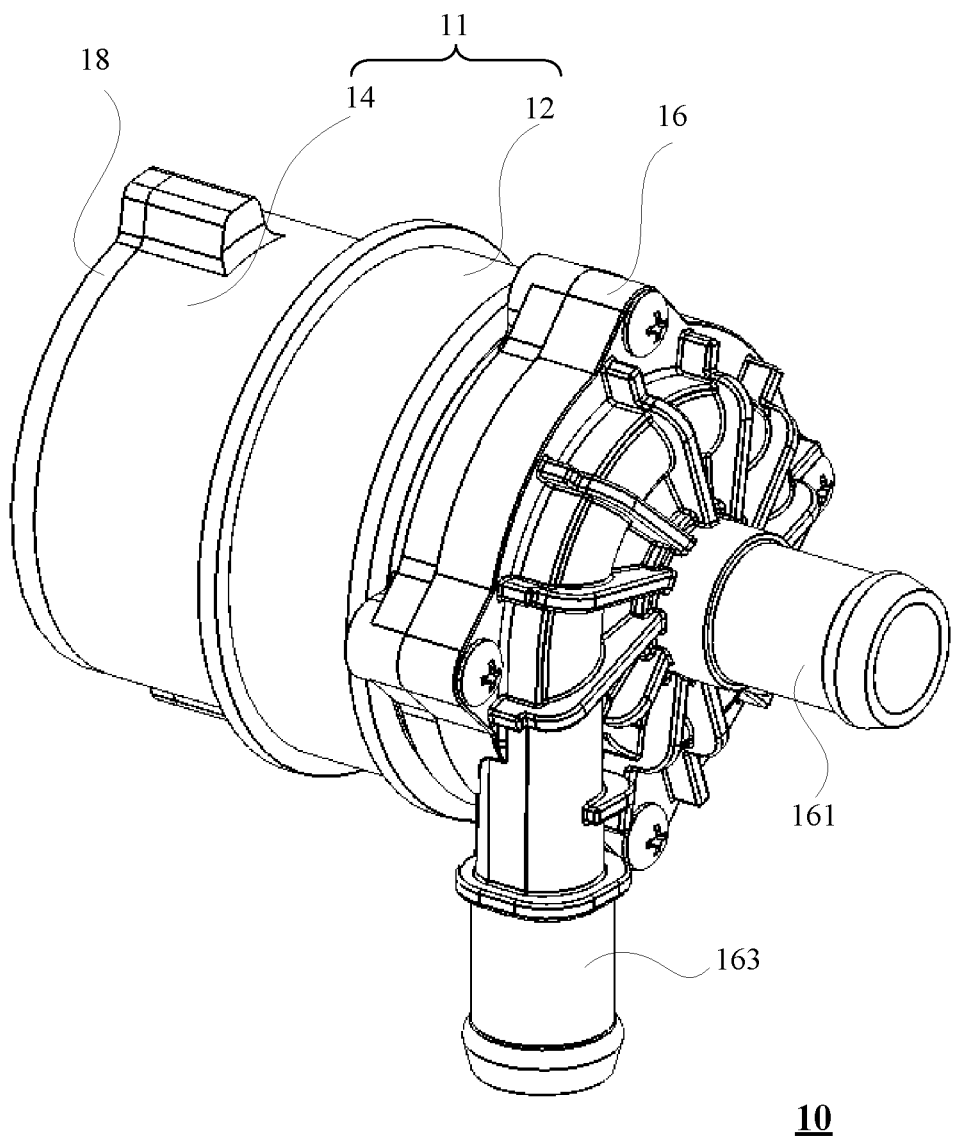
FIG. 1 is a perspective view of an electric coolant pump according to one embodiment of the present invention.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

FIG. 1 illustrates an assembled electric coolant pump 10 according to one embodiment of the present invention. In this embodiment, the electric coolant pump 10 is used in a cooling system of an internal combustion engine to drive coolant to circulate in the cooling system, such that the circulated coolant takes away heat of the engine by heat exchange therewith, thus achieving the cooling result. An outer housing of the electric coolant pump 10 includes a housing 11, a first end cap 16 and a second end cap 18. The housing 11 includes a first housing portion 12 and a second housing portion 14. The first housing portion 12 and the second housing 14 are integrally formed by molding. The first housing portion 12 and the first end cap 16 are air-tightly connected, and the second housing 14 and the second end cap 18 are air-tightly connected. The first end cap 16 is formed with an inlet port 161 and an outlet port 163. The coolant enters the pump body 10 via the inlet port 161 of the first end cap 16 and, after pressurized, flows out via the outlet portion 163 to the internal combustion engine to exchange heat with the cylinders, thereby taking away the heat of the internal combustion engine.

Figure 2:
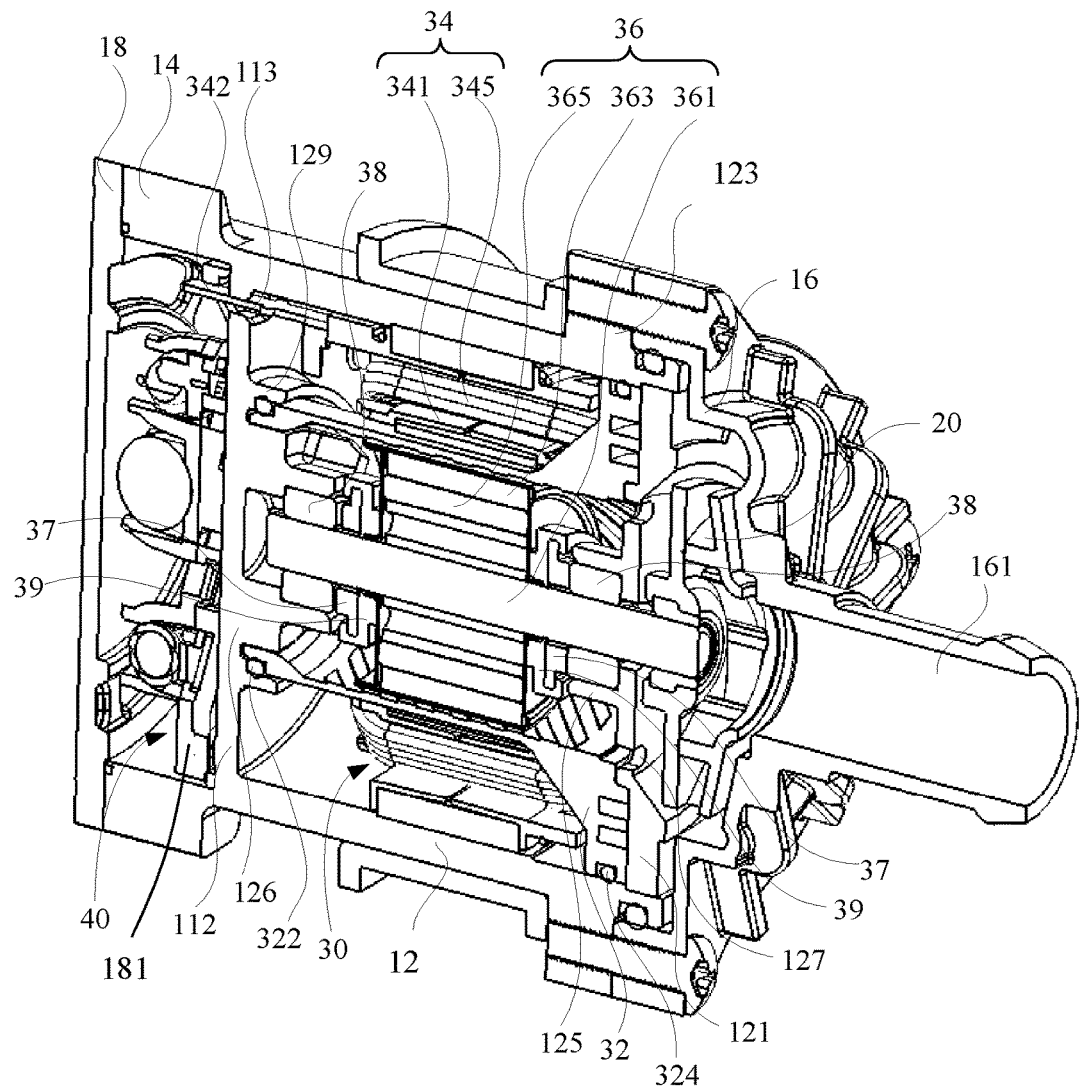
FIG. 2 is a perspective, sectional view of the electric coolant pump of FIG. 1.
Figure 3:
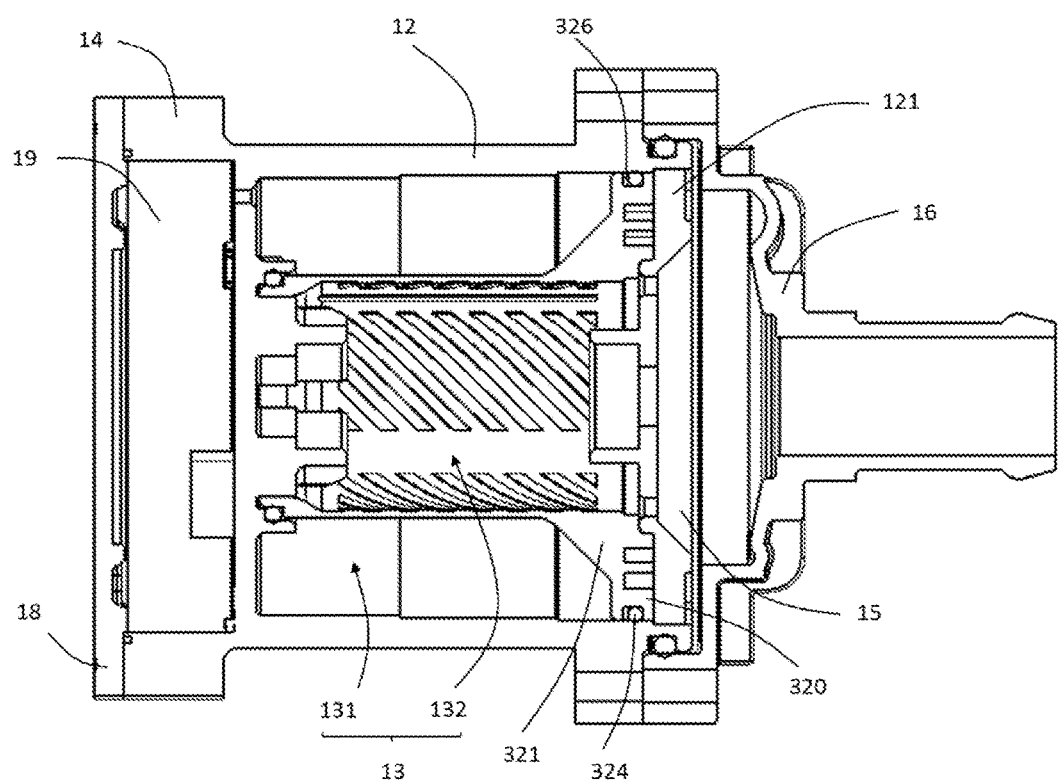
FIG. 3 shows the electric coolant pump of FIG. 2, with some elements removed.

FIG. 2 and FIG. 3 show an internal structure of the electric coolant pump of FIG. 1. In this embodiment, the internal structure of the electric coolant pump includes an impeller 20 received in the housing, a motor 30 for driving the impeller 20 to rotate, and an electrical control unit 40 for controlling operation of the motor 30.

The housing 11 is generally cylindrical, having the first housing portion 12 and the second housing portion 14 integrally formed. An interior of the first housing portion 12 and the second housing portion 14 are spaced by a partition plate 112 The partition plate 112 is integrally formed with the first housing portion 12 and the second housing portion 14.

Figure 4:
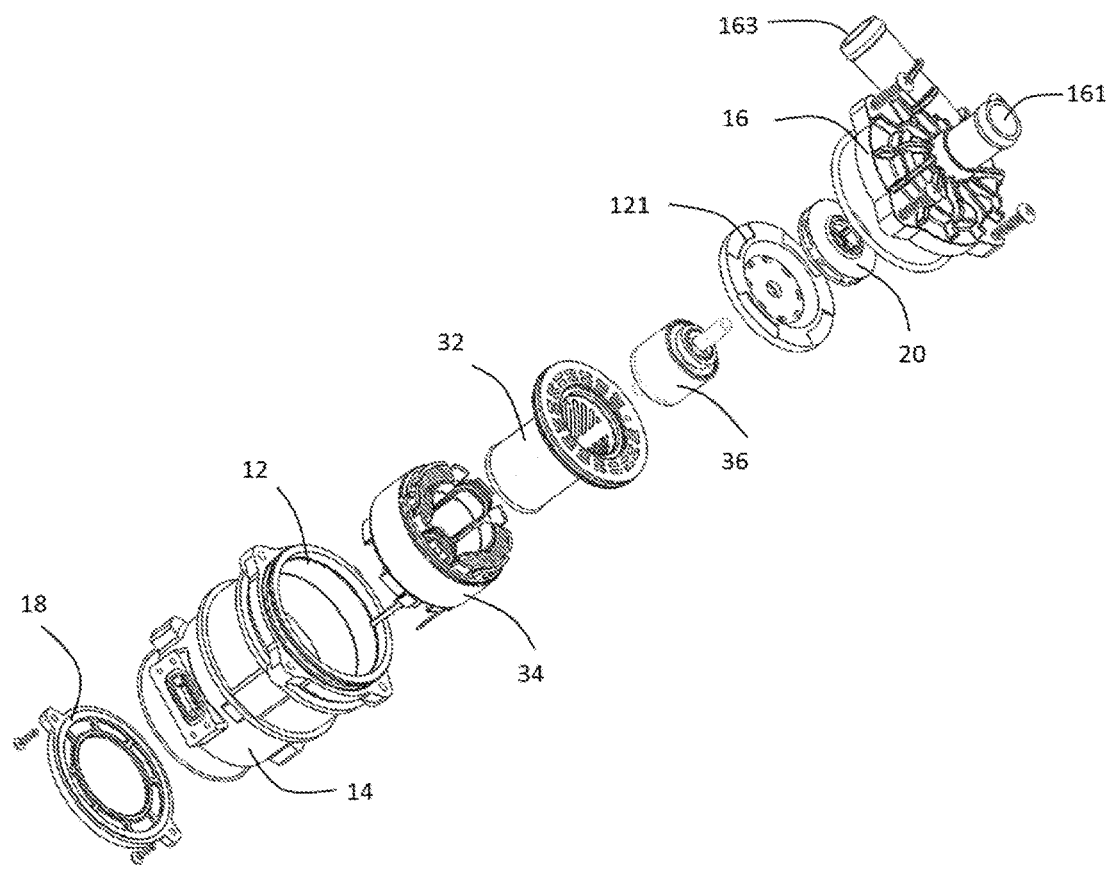
FIG. 4 is an exploded view of the electric coolant pump of FIG. 1.
Figure 5:
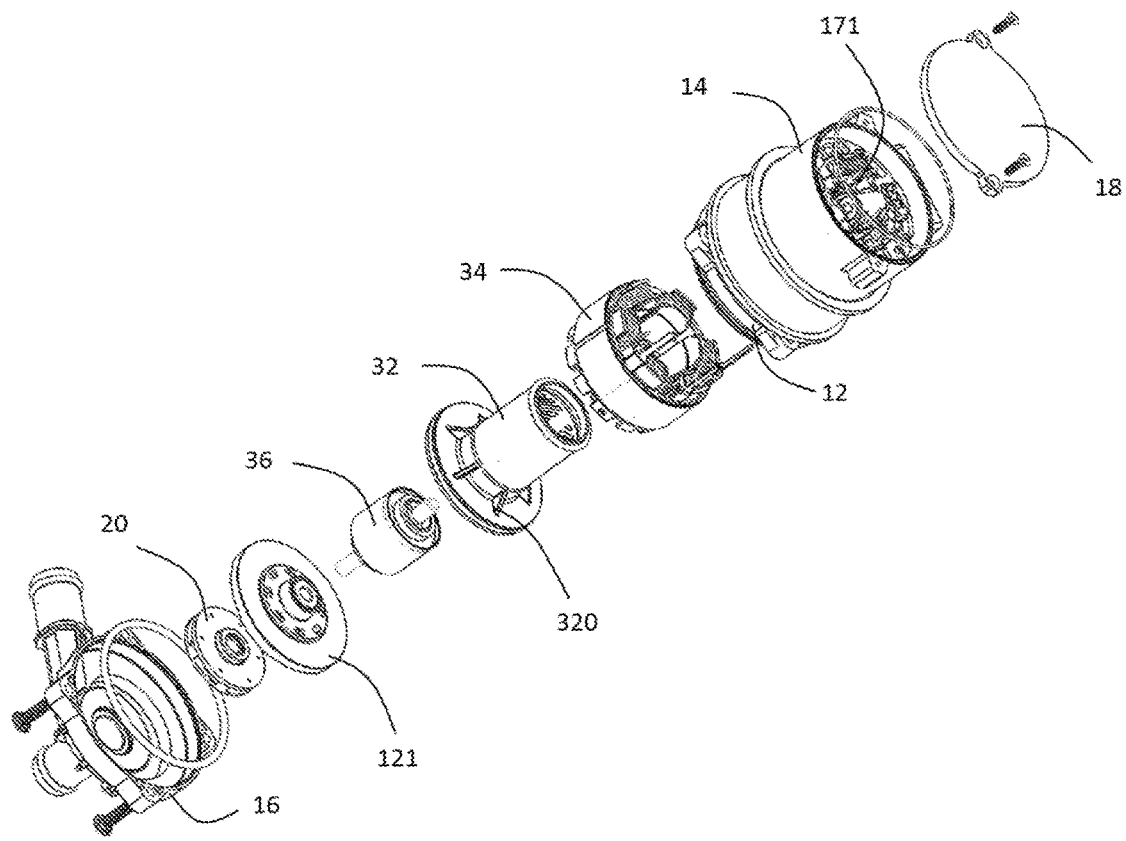
FIG. 5 shows the electric coolant pump of FIG. 4, but viewed from another aspect.

Referring to FIGS. 4 and 5, the first housing 12 is substantially cylindrical, with an open end opposite to the partition plate 112. The first housing 12 includes a plurality of mounting portions 123 at the outer periphery of the open end. The mounting portions 123 are adapted for connecting with the first end cap 16. The pump includes a base plate 121 mounted to the open end of the first housing 12.

As such, the base plate 121, the first housing 12 and the partition plate 112 cooperatively define there between a first receiving space 13 for receiving the motor 30. The base plate 121 and the first end cap 16 define there between a second receiving space 15 for receiving the impeller 20. The second end cap 18 closes an open end of the second housing portion 14. The second end cap 18 and the second housing portion 14 define there between a third receiving space 19 for receiving the electrical control unit 40. As such, the electrical control unit 40 and the impeller 20 are respectively located at opposite axial ends of the motor 30. The electrical connection between the electrical control unit 40 and the motor 30 is established by pins extends through holes 113 of the partition plate 112 to control the operation of the motor 30. The impeller 20 is connected to an output shaft of the motor 30 for synchronous rotation therewith.

In one embodiment, the impeller 20 is a centrifugal impeller. The first end cap 16 forms the inlet port 161 and the outlet port 163. The inlet port 161 may be oriented along an axial direction of the outer housing, and the outlet port 163 is oriented along a tangential direction of the impeller 20, generally perpendicular to the inlet port 161. In the internal combustion engine, the inlet port 161 may be connected to a coolant reservoir through at least a pipe, and the outlet port 163 may be connected with another device such as a condenser or heat exchanger by at least a pipe. With the rotation of the impeller 20, the coolant enters the second receiving space 15 via the inlet port 161 of the first housing portion 12 and, after pressurized by the impeller 20, is discharged via the outlet port 163 and circulated in the car cooling system to take away the heat of the cylinders of the car engine or other devices that need to be cooled.

Connection between the first housing 12 and the first end cap 16 and connection between the second end cap 18 and the second housing portion 14 may be screw connection or rivet connection. A sealing ring is provided at each of the connection between the first housing 12 and the first end cap 16 and the connection between the second end cap 18 and the second housing portion 14, to prevent coolant leakage and prevent external moisture from entering the coolant pump to damage the motor 30 or the electrical control unit 40. As such, air tightness of the overall electric coolant pump can be ensured.

Referring to FIG. 2, the connection between the first housing 12 and the first end cap 16 is radially sealed. That is, the sealing ring between the first housing 12 and the first end cap 16 is radially sandwiched between the first housing 12 and the first end cap 16. The connection between the second housing 14 and the second end cap 18 is axially sealed. In alternative embodiments, the connection between the first housing 12 and the first end cap 16 can be axially sealed; the connection between the second housing 14 and the second end cap 18 can be radially sealed.

The base plate 121 defines a central shaft hole which is coaxial with and passes through the base plate 121. A surrounding area around the shaft hole of the base plate 121 extends perpendicularly into the first receiving space 13 to form a first bearing seat 125. The first bearing seat 125 is coaxial with the shaft hole, for mounting the output shaft of the motor.

The base plate 121 further defines a plurality of through holes 127 surrounding the first bearing seat 125. The through holes 127 fluidly connect the first receiving space with the second receiving space. As such, the coolant can flow from the second receiving space 15 into the first receiving space 13, or from the first receiving space 13 back into the second receiving space 15, through the through holes 127.

Preferably, the base plate 121 defines a recess at its central portion, for receiving the impeller, such that an axial length of the pump can be reduced after assembled. Opposite the recess, the base has a protrusion correspondingly to maintain an necessary thickness.

A central area of the partition plate 112 extends perpendicularly into the first receiving space 13 to form a second bearing seat 126, and a surrounding area around the second bearing seat 126 extends perpendicularly into the first receiving space 13 to form a fixing base 129. The fixing base 129 is coaxial with the second bearing seat 126. In this embodiment, the second bearing seat 126 is disposed opposing to and coaxial with the first bearing seat 125 of the base plate 121.

Referring to FIGS. 4 and 5, the motor 30 is received in the first receiving space 13 defined by the outer housing, and includes a sealing sleeve 32, a stator 34 fixed to an inner wall surface of the first housing portion 12, a rotor 36 rotatably received in the sealing sleeve 32, and two bearings 38 supporting the rotor 36 for rotation. In this embodiment, the sealing sleeve 32 is has a hollow cylindrical body with an annular flange 320 extending radially from an axial end of the body. The annular flange 320 is air-tightly connected to the first housing 12. The other axial end of the body opposite the annular flange 320 is air-tightly connected with the fixing base 129 of the partition plate 112, thus dividing the first receiving space into an inner portion 132 and an outer portion 131 separate from each other. The sealing sleeve 32 and the fixing base 129 are sealingly connected through a sealing ring 322, and the sealing sleeve 32 and the end of the first housing portion 12 are sealingly connected through a sealing ring 324. As such, the inner and outer portions 131, 132 of the first receiving space 13 can be sealingly isolated only by two sealing rings. The inner portion 132 of the first receiving space 13 is in fluid communication with the second receiving space 15 through the through holes 127 of the base plate 121. The outer portion 131 of the first receiving space 13 is fluidly isolated with the second receiving space 15 under the isolation effect of the sealing sleeve 32. As such, the coolant can flow through the through holes 127 into the inner portion 132 of the first receiving space 13 within the sealing sleeve 32, but is prevented from flowing into the outer portion 131 of the first receiving space 13 outside the sealing sleeve 32.

In particular, the annular flange 320 of the sealing sleeve 32 has an outer diameter equaling to or small than an inner diameter of the first housing. The annular flange 320 forms an annular groove at an circumference for receiving the sealing ring 324, The sealing ring 324 received in the groove and abuts against the inner surface of the first housing 12.

Because the first housing portion 12 and the second housing portion 14 of the housing 11 are integrally formed, sealing between the first housing portion 12 and the second housing 14 is not needed, which reduces the number of the areas of the pump that need to be sealed and hence reduces the possibility of sealing failure. In addition, assembling the first housing portion 12 and the second housing portion 14 is also eliminated, which increase the production efficiency.

The stator 34 of the motor is fixed to the inner wall surface of the first housing portion 12 and received in the outer portion 131 of the first receiving space 13 where the coolant cannot enter, which prevents the coolant from affecting the electrical safety of the stator 34. The stator 34 includes a stator core 341 and windings 345 wound around the stator core 341. The stator core 341 may be formed by a plurality of laminations stacked together. The windings 345 may be connected with the electrical control unit 40 through pins 342. The electrical control unit 40 is received in the third receiving space 19, including a circuit board 171 and electronic components such as capacitors and inductors disposed on the circuit board 171, for controlling the electrical current through the windings 345 of the stator 34 and hence controlling operation of the rotor 36. In operation of the electric coolant pump of the present invention, the electrical control unit 40 generates a large amount of heat. Therefore, the housing 11 is preferably made of a metal material such as aluminum, for facilitating dissipating heat generated by the electrical control unit 40.

The rotor 36 is disposed in the sealing sleeve 32 and includes an output shaft 361, a rotor core 363 fixed to the output shaft 361, and at least a permanent magnet 365 fixed to the iron core 363. Two opposite ends of the output shaft 361 both extend out of the iron core 363 to be supported by the two bearings 38. The two bearings 38 are received in the first bearing seat 125 and the second bearing seat 126, respectively. One end of the output shaft 361 rotatably passes through one corresponding bearing 38 and through the shaft hole of the base plate 121 of the housing portion 12 into the second receiving space 15 to form a fixed connection with the impeller 20, such that the output shaft 361 rotates to drive the impeller 20 for synchronous rotation. The other end of the output shaft 361 is rotatably supported by the other bearing 38. A gasket 37 is attached around the output shaft 361 and axially abuts against the bearing 38, such that the output shaft 361 is axially positioned. Preferably, the material of the gasket 37 is ceramic, which can reduce wear due to contact with the bearing 38 during rotation of the rotor. The gasket 37 can have an inner diameter slightly greater than an inner diameter of the output shaft 361. In this case, the gasket 37 can be fixedly attached around the output shaft 361 through a rubber piece 39 for synchronous rotation with the output shaft 361. The rubber piece 39 on one hand has the function of mounting the gasket 37 and, on the other hand, can function as a damper against axial vibrations generated by the rotor during rotation and hence reduce noise of the motor 30. A radial gap is formed between the rotor 36 and the sealing sleeve 32. The coolant can flow through this gap to the partition plate 112 to take away the heat of the partition plate 112 that is absorbed from the electrical control unit 40.

Figure 6:
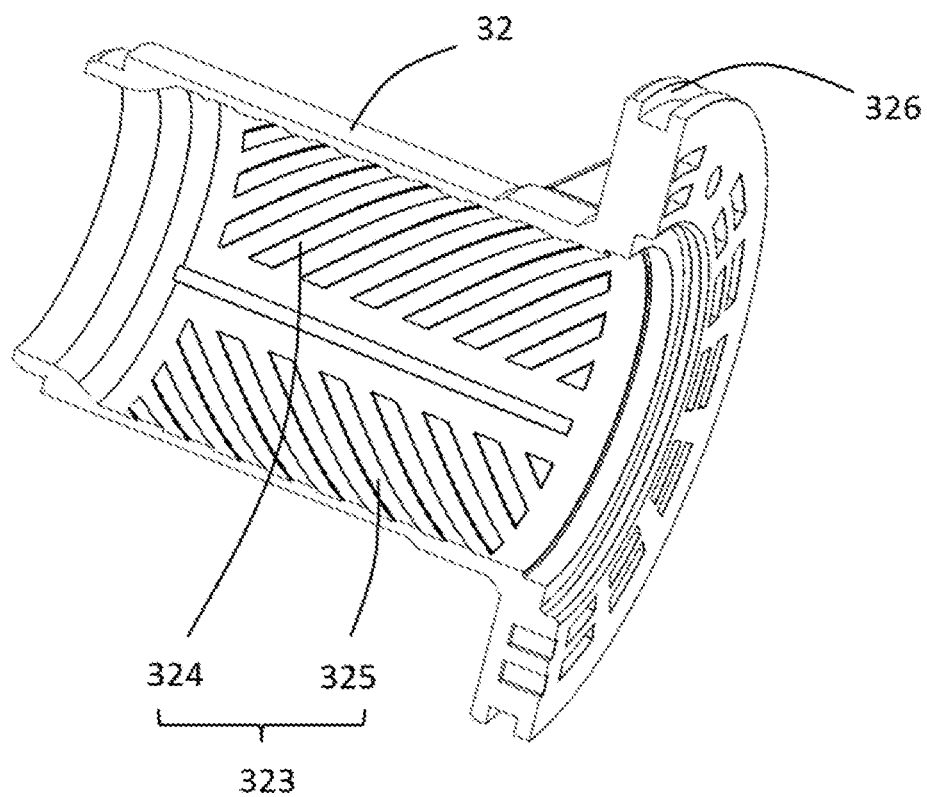
FIG. 6 is a perspective view of a sealing sleeve of the electric coolant pump of FIG. 2.

Referring to FIG. 6, an circumferential edge of the annular flange 320 of the sealing sleeve 32 is connected to an outer periphery of the body by a plurality of connecting ribs 321. The annular flange 320 defines an space to avoid conflict with the protrusion of the base plate 121 to reduce an axial length after assembled. The sealing sleeve 32 has an reduced thickness portion at the end opposite to the annular flange 320 for attaching the sealing ring 322.

One or more groups of ribs 321 project from an inner wall surface of the sealing sleeve 32 into the gap to guide flowing of the coolant. Each group of ribs 321 includes a plurality of spaced ribs 321 that are evenly arranged along an axial direction of the sealing sleeve 32, with flow passages formed between adjacent ribs 321 for allowing the coolant to flow there along. The density of the arrangement of the ribs 321 determines a width of the flow passage. An excess-dense arrangement of the ribs 321 results in the flow passage being too narrow and hence a large flow resistance, which is adverse to the coolant flows smoothly. A excess-sparse arrangement of the ribs 321 results in the flow passage being too wide, which may lead to a failure in guiding the direction of the coolant flow. It will be appreciated by those skilled in the art that the density of arrangement of the ribs 321 can be determined according to the motor power and impeller parameters.

In assembly of the electric coolant pump of the present invention, the sealing sleeve 32 is inserted into the first housing portion 12 via the open end thereof, which makes it possible to set the inner diameter of the sealing sleeve to gradually decrease from the area of the open end of the first housing portion 12 to the area of the partition plate 112. Therefore, air bubbles of the coolant arising from the space increase can be prevented, which improves the cooling result.

In this embodiment, the ribs 321 include two groups of guide-in ribs 324 and two groups of guide-out ribs 325. The two groups of guide-in ribs 324 are disposed adjacent each other along a circumferential direction of the sealing sleeve 32, and the two groups of guide-out ribs 325 are disposed adjacent each other along the circumferential direction. A gap is formed between adjacent groups of ribs 324, 325 along the circumferential direction of the sealing sleeve 32. The gap extends along the axial direction of the sealing sleeve 32 in this embodiment. The guide-in ribs 324 and guide-out ribs 325 extends inclined with respect to the axial direction of the sealing sleeve 32. The inclined direction of the guide-in ribs 324 is different from the inclined direction of the guide-out ribs 325, and preferably the inclined direction of the guide-in ribs 324 and the inclined direction of the guide-out ribs 325 are symmetrical with respect to an axial direction of the sealing sleeve 32.

In operation of the electric coolant pump of the present invention, the electrical control unit 40 is powered on to control the electrical current through the windings 345 of the stator 34. The stator 34 and the rotor 36 interact with each other to drive the impeller 20 to rotate to create a negative pressure, by means of which the coolant is drawn into the second receiving space 15. Because the second receiving space 15 is in flow communication with the inner portion 132 of the first receiving space 13 through the through holes 127 of the base plate 121, a portion of the coolant flows through the through hole 127 into the sealing sleeve 32 and the gap between the rotor 36 and the sealing sleeve 32. During rotation of the rotor 36 relative to the sealing sleeve 32, under the guide of the ribs 321, the coolant not only rotates along with the rotor 36, but it also flows along an extending direction of the ribs 321. In this embodiment, the sealing sleeve 32 is formed with the symmetrical guide-in ribs 324 and guide-out ribs 325. The guide-in ribs 324 guide the coolant toward the partition plate 112 to absorb the heat generated by the electrical control unit 40. The guide-out ribs 325 are disposed symmetrically with the guide-in ribs 323, and the rotation direction of the rotor 36 is not changed. Therefore, the guide-out ribs 325 guide the coolant at the area of the end cap 14 toward the base plate 121. As such, the sealing sleeve 32 forms substantially independent coolant guide-in flow passages and guide-out flow passages. The coolant is directed by the guide-in ribs 324 to the partition plate 112 where the coolant absorbs the heat of the electrical control unit 40, then directed by the guide-out ribs 325 to the base plate 121, and finally enters the second receiving space 15 via the through holes 127 of the base plate 121, thus forming a complete circulation loop which effectively takes away the heat of the electrical control unit 40 so that heat dissipation of the electrical control unit 40 itself is achieved. Preferably, the base plate 121 has a through hole 127 corresponding to each group of guide-in ribs 324 and each group of guide-out ribs 325.

When the impeller is configured to have an orientation direction opposite to that in this embodiment, and the motor is configured to drive the impeller to rotate in an opposite direction, the functions of the guide-in ribs 324 and guide-out ribs 325 need to be swapped. In this case, the coolant is guided by the ribs 325 into the first receiving space 13 and guided by the ribs 324 out of the first receiving space 13.

In view of the foregoing, in the electric coolant pump of the present invention, the ribs 321 are formed in the sealing sleeve 32 to guide the coolant flow, such that the coolant circulates in the sealing sleeve 32 to cool the electrical control unit 40, thus ensuring the coolant pump itself at a low temperature state. It should be understood that the ribs 321 are formed to guide the coolant flow, and the shape, angle, density of arrangement and thickness of the ribs 321 all influence the guiding effect on the coolant flow and can be determined according to needs.

The coolant pump disclosed in this disclosure not only can be used in the internal combustion engine cooling system, but it is also applicable in any device that needs to be cooled, such as a turbine engine or boiler system.

A sufficient description of the cooling pump of the present invention has been made as above. The first housing portion and the second housing portion of the coolant pump are integrally formed, which reduces the number of the areas of the pump that need to be sealed and hence improves the sealing capability of the pump. In addition, with the two housing portions integrally formed, the procedure of assembling the two housing portions is also eliminated, which enhances the production efficiency. Moreover, the sealing sleeve is inserted into the first housing portion from the side at which the impeller is located, which makes it possible to set the inner diameter of the sealing sleeve to gradually decrease from the area of the impeller to the area of the partition plate. Therefore, air bubbles residing in the coolant prior to operation and generated in the cooling during operation can be effectively removed.

Although the invention is described with reference to one or more preferred embodiments, it should be appreciated by those skilled in the art that various modifications are possible. For example, the coolant pump disclosed in this disclosure not only can be used in the internal combustion engine cooling system, but it also can be equally applicable in any device that needs to be cooled, such as a turbine engine or boiler system. Therefore, the scope of the invention is to be determined by reference to the claims that follow.

The invention claimed is:

1. An electric coolant pump comprising:
    an outer housing comprising a first housing portion, a second housing portion, and a partition plate integrally formed, the partition plate disposed between the first housing portion and the second housing portion, wherein the first housing portion and the second housing portion are undetachably and air-tightly connected to each other without any sealing member interposed between the first housing portion and the second housing portion;
    a motor received in the first housing portion, and comprising a sealing sleeve, a stator disposed on an inner wall of the first housing portion, and a rotor rotatably received in the sealing sleeve;
    an impeller driven by the rotor of the motor, and an electrical control unit received in the second housing portion and electrically connected to the motor;

wherein a plurality of ribs are formed on an inner surface of the sealing sleeve, adjacent ribs are spaced from each other with pathways defined there between;

wherein the plurality of ribs comprises at least one group of guide-in ribs and at least one group of guide-out ribs, the guide-in ribs and the guide-out ribs extend inclined with respect to an axial direction of the sealing sleeve, the inclined direction of the guide-in ribs is different from the inclined direction of the guide-out ribs.

2. The electric coolant pump of claim 1, further comprising a base plate disposed in the first housing portion adjacent an end of the impeller, wherein the first housing portion, the partition plate and the base plate cooperatively define a first receiving space, and the motor is received in the first receiving space.

3. The electric coolant pump of claim 2, wherein the sealing sleeve is air-tightly connected to one end of the first housing portion away from the partition plate, and the sealing sleeve is air-tightly connected with the partition plate, thus dividing the first receiving space into an inner receiving space and an outer receiving space.

4. The electric coolant pump of claim 3, further comprising a first end cap, wherein the first end cap and the base plate cooperatively define a second receiving space, the impeller is received in the second receiving space, the base plate defines a plurality of through holes for allowing the coolant to flow between the second receiving space and the inner receiving space of the first receiving space.

5. The electric coolant pump of claim 2, wherein the base plate defines a recess for receiving the impeller, and forms a protrusion corresponding to the recess at an opposite end, the sealing sleeve defines a space corresponding to the protrusion.

6. The electric coolant pump of claim 4, further comprising a second end cap, wherein the second end cap, the second housing portion and the partition plate cooperatively define a third receiving space, and the electrical control unit is disposed in the third receiving space.

7. The electric coolant pump of claim 1, wherein a first axial end of the sealing sleeve adjacent to the partition plate has an inner diameter smaller than the diameter of a second axial end of the sealing sleeve away from the partition plate.

8. The electric coolant pump of claim 1, wherein the partition plate comprises a fixing base, to which the sealing sleeve is air-tightly connected.

9. The electric coolant pump of claim 1, wherein the sealing sleeve comprises an annular flange which is air-tightly attached to the first housing portion.

10. The electric coolant pump of claim 1, further comprising a base plate mounted to an axial end of the first housing portion adjacent to the impeller, wherein the base plate defines at least one through hole corresponding to each group of guide-in ribs and guide-out ribs.

11. The electric coolant pump of claim 10, wherein the partition plate defines a plurality of holes, and the electrical control unit is electrically connected to the motor by a plurality of pins extending through the holes of the partition plate.

12. The electric coolant pump of claim 1, wherein the housing is made of aluminum.

* * * * *